Patented May 12, 1931

1,805,178

UNITED STATES PATENT OFFICE

NORMAN E. LEMMON, OF WHITING, INDIANA, ASSIGNOR TO STANDARD OIL COMPANY, OF WHITING, INDIANA, A CORPORATION OF INDIANA

REVIVIFYING SPENT FULLER'S EARTH

No Drawing.   Application filed March 20, 1925.   Serial No. 17,132.

The present invention relates to improvements in methods for revivifying spent fuller's earth, particularly that employed in the refining and decolorizing of petroleum oils. In carrying out the present invention, spent fuller's earth, particularly that employed in the filtration and decolorizing of acid treated residues and distillate oils, is preliminarily washed with naphtha to remove the residual oil remaining in the fuller's earth. No attempt is made, however, to completely remove naphtha-soluble substances from the filtering material, as in ordinary practice hitherto. After the preliminary wash with naphtha, if desired, dry steam may be passed through the filtering material in order to remove the naphtha remaining therein. In general, however, in the practice of the present invention, it is preferred to directly subject the clay, with any retained naphtha that may be present, to the action of a second solvent, as hereinafter more fully set forth.

The naphtha-washed filtering material, (preferably without the steam treatment), is treated with a mixture of naphtha, benzol and alcohol. This mixture may contain from 25 to 75% naphtha, from 2 to 25% of alcohol and the remainder benzol. In general it is preferred that from 50 to 75% naphtha and 5 to 10% alcohol be present in the mixture. Thus, the following mixtures have been found to be highly satisfactory solvents:

(Example No. 1) Naphtha 25%; alcohol 10%; benzol 65%.
(Example No. 2) Naphtha 50%; alcohol 5%; benzol 45%.
(Example No. 3) Naphtha 75%; alcohol 5%; benzol 20%.

By the term alcohol I include the water soluble alcohols having up to 3 carbon atoms; namely, methyl alcohol, ethyl alcohol, propyl alcohol and isopropyl alcohol.

In washing the fuller's earth, the washing may be suitably effected by circulation or by thorough intermingling of the fuller's earth with the washing liquid and subsequent separation by filter pressing, either in an ordinary filter press or in a filter of the continuously operating drum or disk type. In general, at each stage it is preferred to wash the fuller's earth a plurality of times; say two or more. The first washing fluid may suitably be transferred to solvent recovery stills, and the washing fluid recovered by distillation, a pitchy or tarry residue being left which may be employed, for example, in the manufacture of road oil, saturating pitches and the like. Washing liquid used as a second or subsequent wash for the filtering material is preferably again employed as a first wash before being transferred to the stills for recovery.

Revivification of the spent fuller's earth by means of successive washes with naphtha and with the solvent liquid above set forth were found to result in a regenerated product having substantially the same decolorizing properties as the original material. Thus, in the case of an oil which, on treatment with fresh fuller's earth, gave a product having a color of about 2.7 Tag.-Robinson, on revivification with naphtha followed by treatment with the solvent liquid described as specific Example No. 2 above, the fuller's earth gave a product which, on treating the same oil, likewise gave a filtrate color of about 2.7 Tag.-Robinson. A second revivification, using naphtha and the same solvent liquid, the treated earth gave on treating a like oil, a product with a color of 2.5 to 2.7 Tag.-Robinson. Similar results were obtained with the solvent liquids described in the other examples hereinbefore referred to.

The treated earth, before reuse, is preferably heated by dry heat to at least 250° and preferably to 500 to 600° F. for complete removal of the solvent.

I claim:

1. In the method of revivifying spent filtering materials employed in decolorizing petroleum oils, the steps of washing such filtering materials with a mixture containing naphtha, benzol and alcohol.

2. In the method of revivifying spent fuller's earth used in decolorizing petroleum oils, the step of washing such fuller's earth with a mixture containing 25 to 75% naphtha, 2 to 25% alcohol and the remainder benzol in quantity of approximately 20% or more.

3. The method of revivifying spent fuller's earth used in decolorizing petroleum oils which comprises removing oil from such filtering materials, and subsequently washing the filtering material with naphtha, benzol and alcohol in admixture.

4. The method of revivifying spent fuller's earth used in decolorizing petroleum oils comprising removing oil from fuller's earth, subsequently washing it with a mixture of naphtha, benzol and alcohol, and subjecting the washed fuller's earth to dry heat to remove the solvent.

5. The method of revivifying spent fuller's earth used in decolorizing petroleum oils which comprises removing oil from such filtering materials, and subsequently washing the filtering material with a mixture containing 25 to 75% naphtha, 2 to 25% alcohol and benzol in quantity of approximately 20% or more.

NORMAN E. LEMMON.